United States Patent
Seo et al.

(10) Patent No.: US 9,419,767 B2
(45) Date of Patent: Aug. 16, 2016

(54) METHOD FOR DEVICE-TO-DEVICE COMMUNICATION IN WIRELESS COMMUNICATION SYSTEM, AND APPARATUS THEREFOR

(71) Applicant: LG ELECTRONICS INC., Seoul (KR)

(72) Inventors: Hanbyul Seo, Anyang-si (KR); Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 14/405,237

(22) PCT Filed: Jun. 18, 2013

(86) PCT No.: PCT/KR2013/005351
§ 371 (c)(1),
(2) Date: Dec. 3, 2014

(87) PCT Pub. No.: WO2013/191438
PCT Pub. Date: Dec. 27, 2013

(65) Prior Publication Data
US 2015/0163037 A1    Jun. 11, 2015

Related U.S. Application Data

(60) Provisional application No. 61/661,791, filed on Jun. 19, 2012.

(51) Int. Cl.
*H04L 5/00* (2006.01)
*H04W 76/02* (2009.01)
(Continued)

(52) U.S. Cl.
CPC ............ *H04L 5/0053* (2013.01); *H04L 5/0051* (2013.01); *H04L 5/0055* (2013.01); *H04L 5/0057* (2013.01); *H04L 5/0094* (2013.01); *H04W 72/048* (2013.01); *H04W 72/0413* (2013.01); *H04W 72/0446* (2013.01); *H04W 76/023* (2013.01); *H04W 88/02* (2013.01); *H04W 92/18* (2013.01)

(58) Field of Classification Search
None
See application file for complete search history.

(56) References Cited

U.S. PATENT DOCUMENTS

2010/0316096 A1   12/2010   Adjakple et al.
2011/0300892 A1   12/2011   Hakola et al.
(Continued)

FOREIGN PATENT DOCUMENTS

EP        2 624 473 A2      8/2013
KR    10-2011-0103852 A     9/2011
(Continued)

OTHER PUBLICATIONS

Renesas Mobile Europe, "Discussion on DRX for CC specific TDD configuration", 3GPP TSG-RAN WG2 Meeting #77bis, Mar. 26-30, 2012, R2-121406, 3 pages.

*Primary Examiner* — Andrew Oh
(74) *Attorney, Agent, or Firm* — Birch, Stewart, Kolasch & Birch, LLP

(57) ABSTRACT

Disclosed is a method for a device, communicating device-to-device, for receiving a signal in a wireless communication system. Specifically, the method comprises the steps of: receiving, from another device, a signal via device-to-device communication during a first sub-frame; and receiving, from a base station, a signal during a second sub-frame, wherein the signal is received via device-to-device communication when the first sub-frame and the second sub-frame overlap.

12 Claims, 11 Drawing Sheets

(51) Int. Cl.
*H04W 72/04* (2009.01)
*H04W 92/18* (2009.01)
*H04W 88/02* (2009.01)

(56) References Cited

U.S. PATENT DOCUMENTS

2013/0170387 A1* 7/2013 Wang .................... H04W 4/005
 370/252
2013/0201954 A1* 8/2013 Gao .................. H04W 72/0413
 370/329
2013/0229952 A1* 9/2013 Koskinen .................. H04L 5/16
 370/278
2013/0252654 A1* 9/2013 Dimou .................. H04W 72/04
 455/509
2014/0355557 A1* 12/2014 Peng ..................... H04W 16/14
 370/330

FOREIGN PATENT DOCUMENTS

KR 10-2012-0017470 A 2/2012
KR 10-2012-0033283 A 4/2012

* cited by examiner

FIG. 2
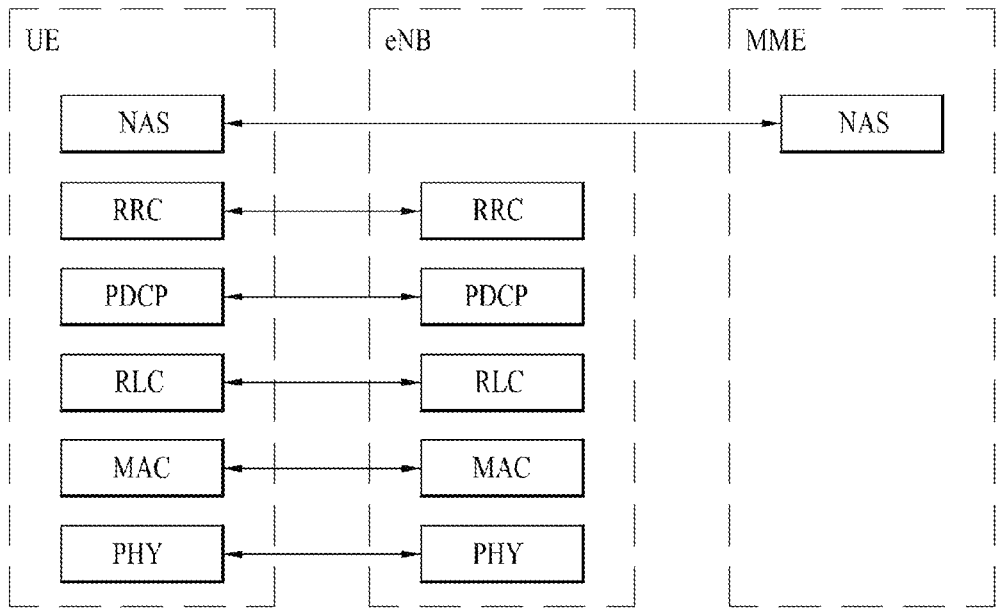
(a) CONTROL-PLANE PROTOCOL STACK
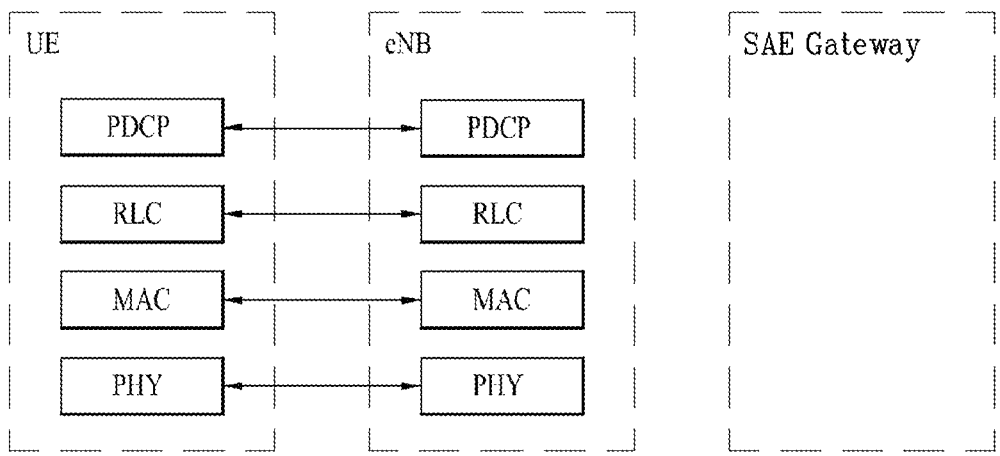
(b) USER-PLANE PROTOCOL STACK

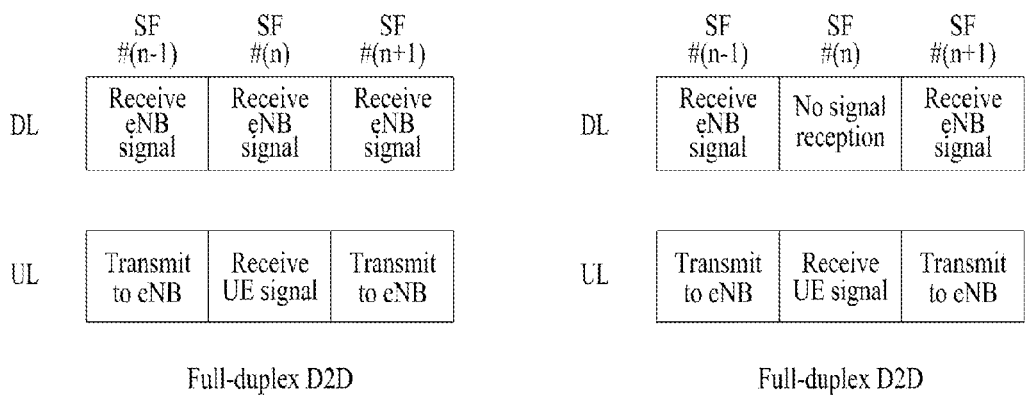
FIG. 7
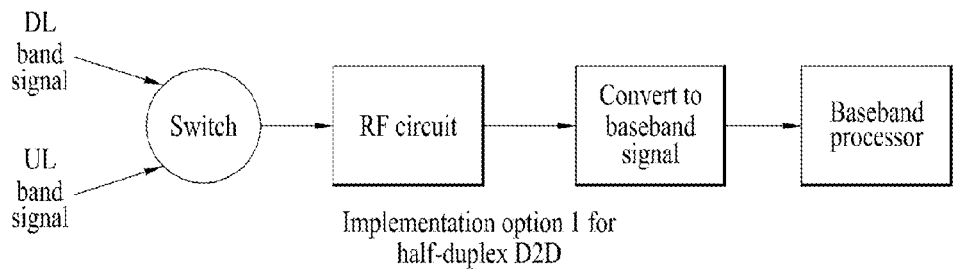
FIG. 8
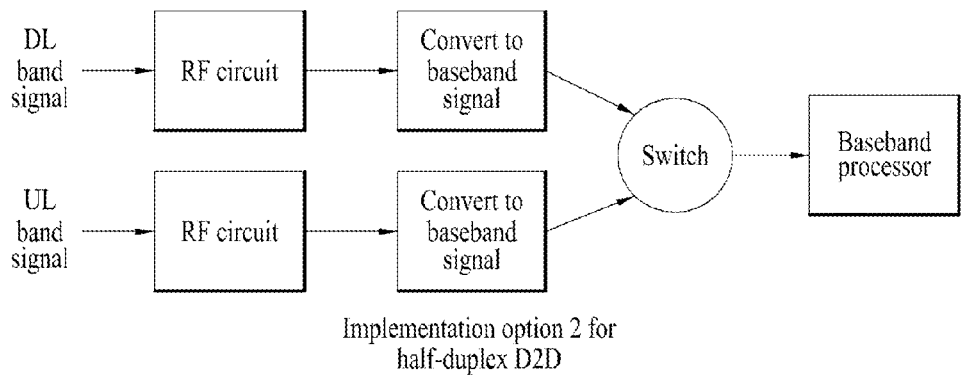

FIG. 12
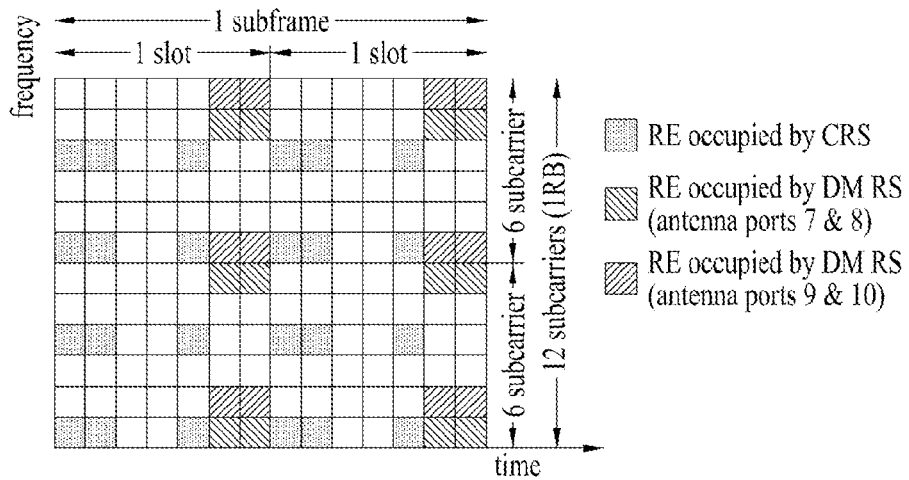
(a)
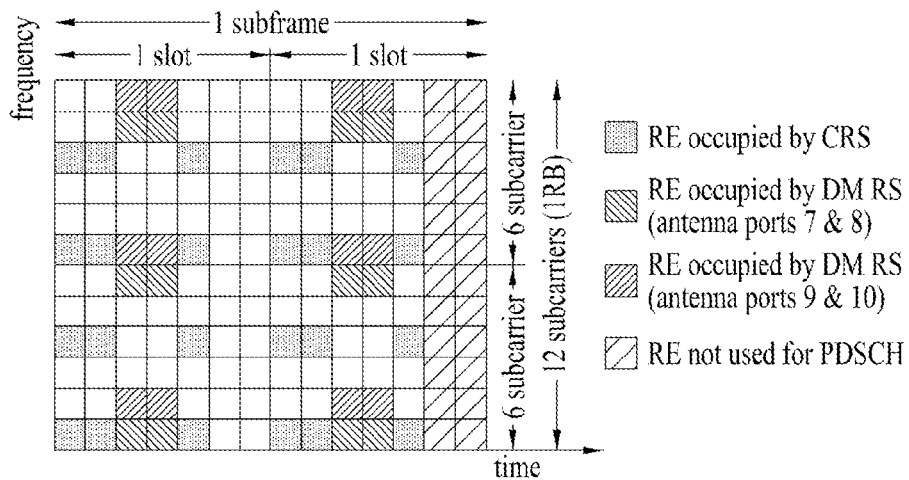
(b)
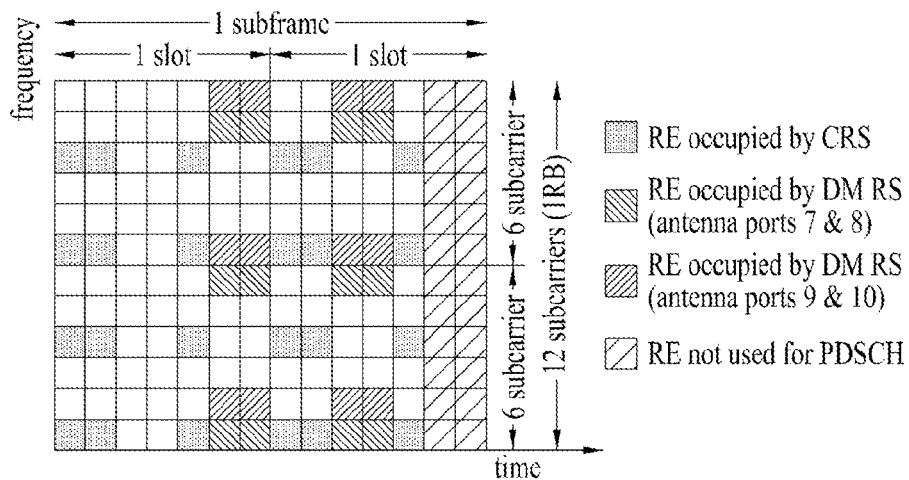
(c)

METHOD FOR DEVICE-TO-DEVICE COMMUNICATION IN WIRELESS COMMUNICATION SYSTEM, AND APPARATUS THEREFOR

CROSS REFERENCE TO RELATED APPLICATIONS

This application is the National Phase of PCT International Application No. PCT/KR2013/005351, filed on Jun. 18, 2013, which claims priority under 35 U.S.C. 119(e) to U.S. Provisional Application No. 61/661,791, filed on Jun. 19, 2012, all of which are hereby expressly incorporated by reference into the present application.

TECHNICAL FIELD

The present invention relates to a wireless communication system and, more particularly, to a method and apparatus for performing device-to-device (D2D) communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for performing device-to-device (D2D) communication in a wireless communication system.

Technical Solution

The object of the present invention can be achieved by providing a method for, at a user equipment (UE) for performing device-to-device (D2D) communication, receiving a signal in a wireless communication system including receiving a signal from another UE via D2D communication on a first subframe and receiving a signal from a base station on a second subframe, wherein reception of the signal via D2D communication is performed when the first subframe and the second subframe overlap.

The method may further include transmitting, to the base station, information indicating that only one of reception of the signal via D2D communication and reception of the signal from the base station may be performed.

The method may further include, when the signal from the base station is a response signal to an uplink data channel transmitted from the UE to the base station, reporting, to a higher layer, that the response signal is a positive response.

When the signal is received from the base station on a previous subframe of the first subframe, a predetermined number of last symbols of the previous subframe may not be used to receive the signal from the base station. When the signal is received from the base station on a next subframe of the first subframe, a predetermined number of start symbols of the next subframe may not be used to receive the signal from the base station. The predetermined number may be determined based on timing advance applied to the first subframe.

According to another aspect of the present invention, there is provided a user equipment (UE) apparatus for performing device-to-device (D2) communication in a wireless communication system including a wireless communication module configured to transmit and receive a signal to and from a base station or a counterpart UE apparatus of D2D communication and a processor configured to process the signal, wherein the processor receives a signal from the counterpart UE apparatus on a first subframe via D2D communication, receives a signal from the base station on a second subframe, and performs reception of the signal via D2D communication when the first subframe and the second subframe overlap.

Advantageous Effects

According to embodiments of the present invention, it is possible to efficiently perform device-to-device (D2D) communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 7 is a diagram illustrating a difference between full-duplex D2D communication and half-duplex D2D communication in a frequency division duplex (FDD) system.

FIG. 8 is a diagram showing the structure of a receiver of a UE for performing half-duplex D2D communication.

FIG. 12 is a diagram showing an example of mapping a demodulation reference signal (DM-RS) when transmission of a PDSCH early finishes, according to an embodiment of the present invention.

BEST MODE

Figure 1:
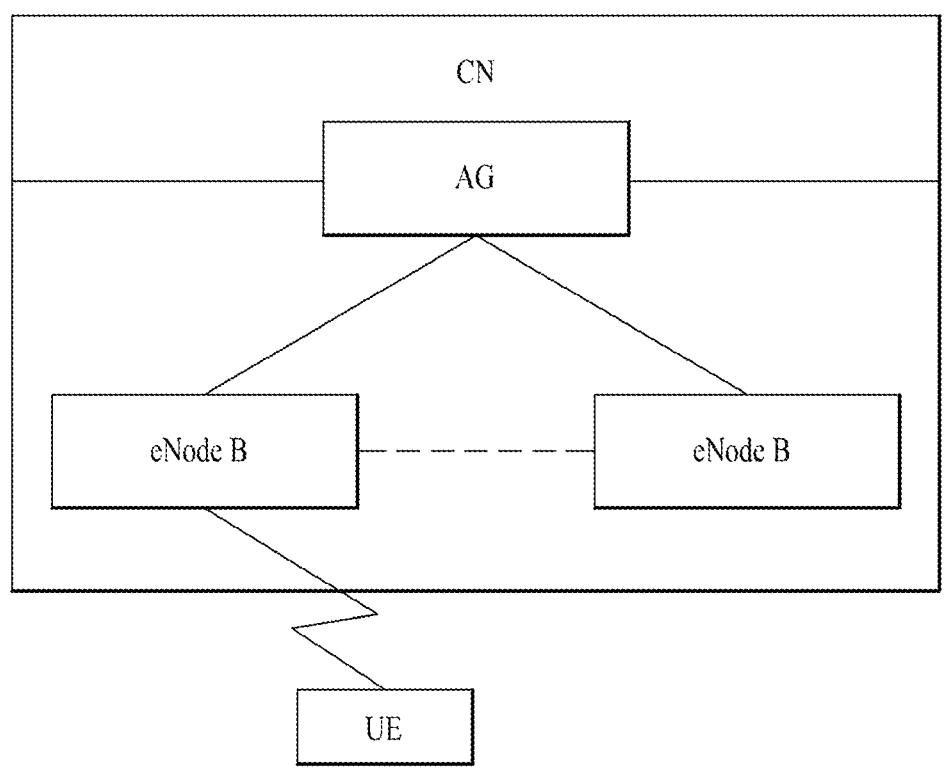
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
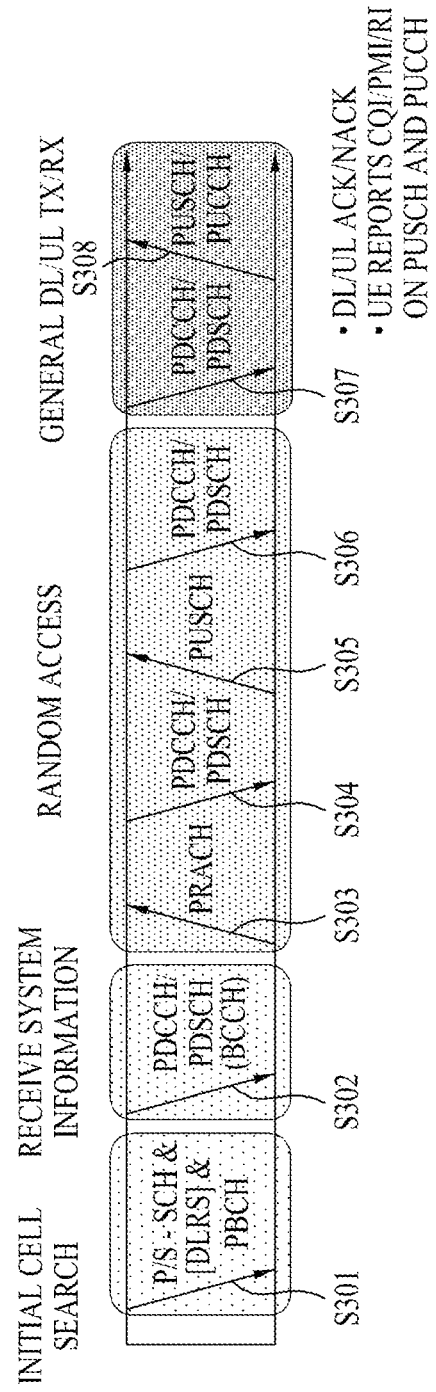
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
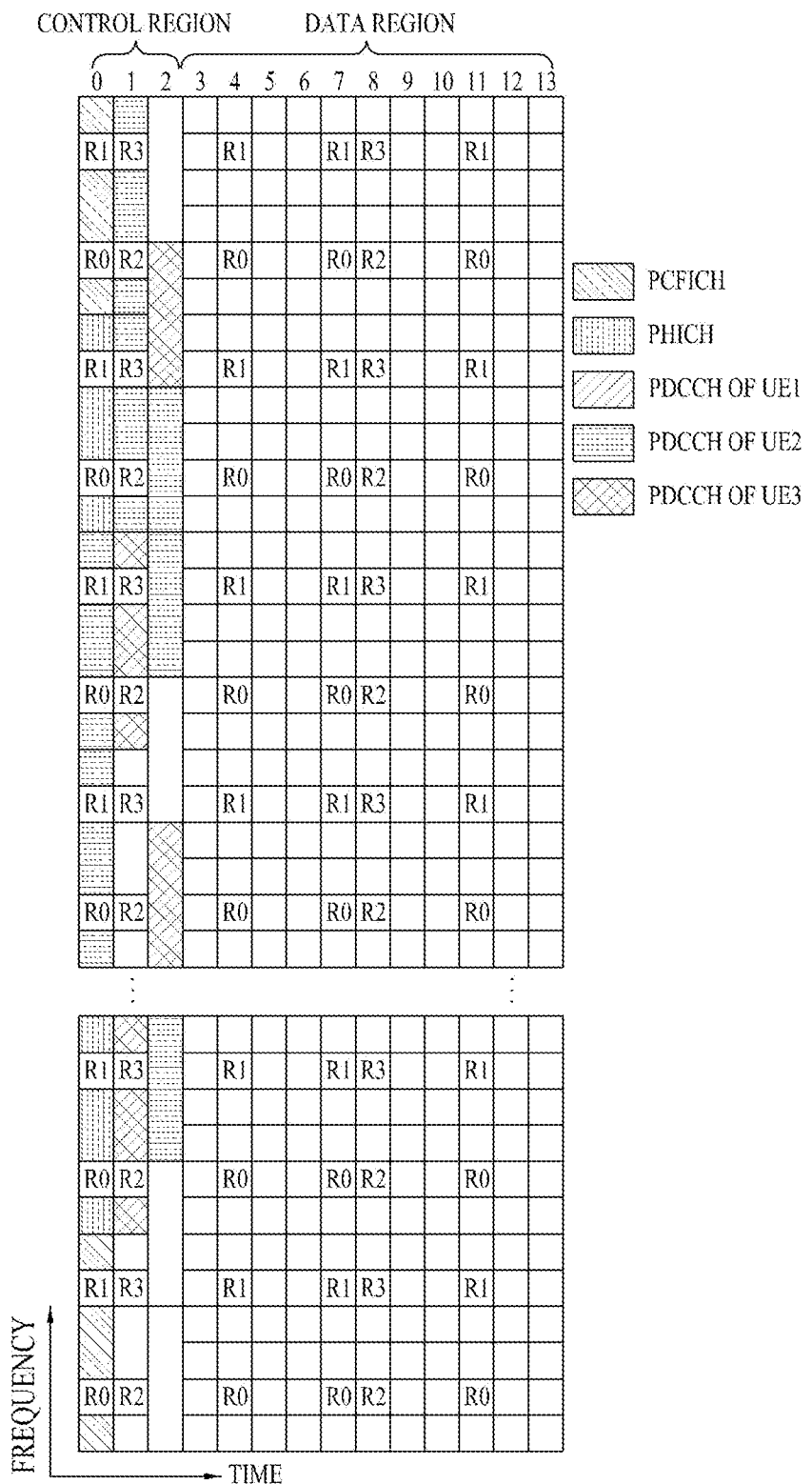
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
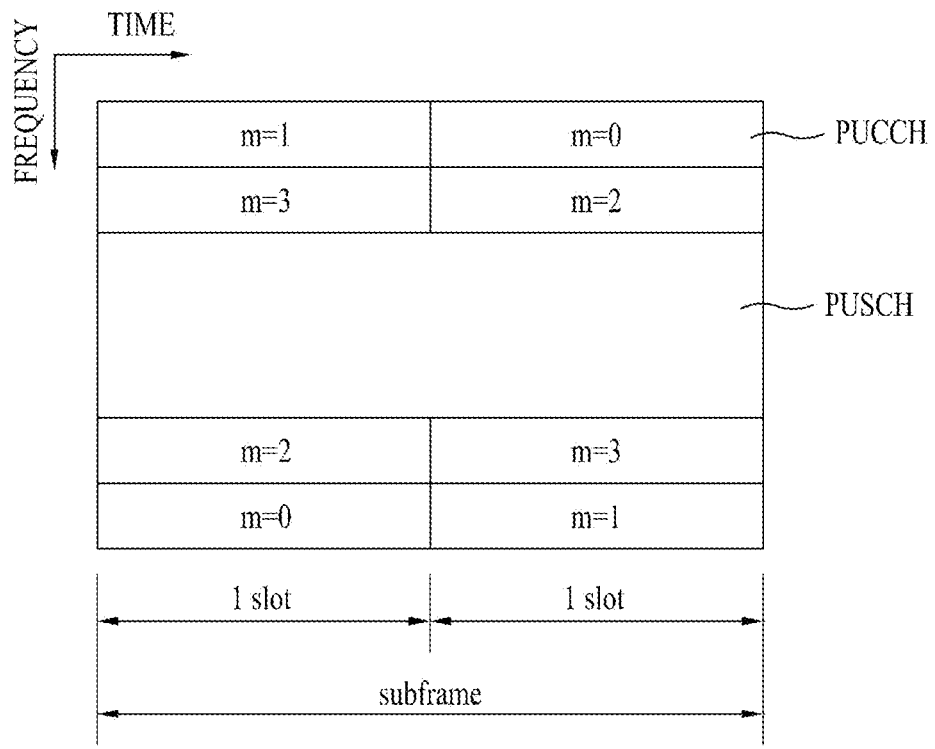
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
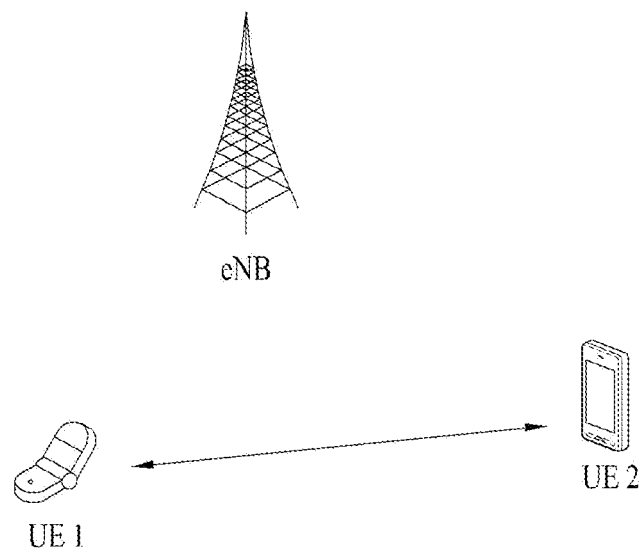
FIG. 6 is a diagram illustrating the concept of device-to-device (D2D) communication.

FIG. 6 is a diagram illustrating the concept of D2D communication.

Referring to FIG. 6, in device-to-device (D2D) communication in which a UE directly performs wireless communication with another UE, that is, in direct communication between UEs, an eNB may transmit a scheduling message indicating D2D transmission and reception. A UE participating in D2D communication receives the D2D scheduling message from the eNB and performs transmission and reception operation indicated by the D2D scheduling message.

In the present invention, as shown in FIG. 6, a method for detecting a UE, which is a communication counterpart, when a UE directly performs D2D communication with another UE using a radio channel is proposed. The UE means a terminal of a user but a network entity such as an eNB may be regarded as a UE when the network entity transmits and receives a signal according to a communication method between UEs.

In the present invention, as shown in FIG. 6, a half-duplex D2D communication method for performing only one of two communication methods at a specific time if a UE performs D2D communication with another UE in a state of maintaining communication with an eNB is proposed.

In FIG. 6, UE #2 performs D2D communication with UE #1 to directly exchange data with UE #1 and, at the same time, maintains a communication link with the eNB to exchange necessary information with the eNB. That is, since even a UE for performing D2D communication should maintain the communication link with the eNB, at least two communication links are simultaneously maintained.

In general, D2D communication preferably uses uplink resources for transmitting a signal from a UE to an eNB, because a transmission circuit at uplink resources of the UE may be reused and interference with a neighboring UE may be avoided. More specifically, in an uplink communication link between the eNB and the UE, since a receiver is an eNB and is mounted in a region separated from the UE (e.g., on the roof of a building), interference of D2D communication using uplink resources with a communication link between the eNB and the UE is prevented. Uplink resources mean uplink band in an FDD system and time resources set to an uplink subframe in a TDD system. Similarly, downlink resources mean downlink band in a FDD system and time resources set to a downlink subframe.

While an existing UE has signal transmission capabilities in uplink resources and signal reception capabilities in downlink resources, a D2D UE further has signal reception capabilities in uplink resources. In addition, the D2D UE should receive a signal using downlink resources in order to receive a signal of an eNB. The UE can perform reception of signals using uplink resources and downlink resources and subsequent signal processing thereof and can maintain a communication link with the eNB while performing D2D communication. If a reception circuit at downlink resources and a reception circuit at uplink resources are separately implemented (this is referred to as full-duplex D2D communication), simultaneous signal reception using both resources is possible at the same time. However, this increases UE implementation costs. If information exchanged via D2D communication is restricted, such as if the number of times of D2D communication is small or if a UE determines whether a counterpart UE of D2D communication is close thereto via D2D communication and exchanges real data via another channel such as a wireless local area network (LAN), full-duplex D2D communication unnecessarily increases costs.

In contrast, if only one signal reception circuit of a UE is implemented and is used while switching between downlink resources and uplink resources (this is referred to as half-duplex D2D communication), reception of downlink resources and reception of uplink resources may not be simultaneously performed but UE implementation costs may be reduced. This is particularly useful if D2D communication is intermittently performed.

FIG. 7 is a diagram illustrating a difference between full-duplex device-to-device communication and half-duplex D2D communication in a frequency division duplex (FDD) system.

In FIG. 7, assume that boundaries of a downlink subframe and an uplink subframe completely match, a transmission/reception band and an operation band may be rapidly switched and a separate guard period is not required. In FIG. 7, the UE performs D2D communication for receiving a signal of another UE via uplink resources on subframe #n. While the signal of the eNB may be received via downlink resources on that subframe in full-duplex D2D communication operation, the signal of the eNB may not be received via downlink resources in half-duplex D2D communication operation.

FIG. 8 is a diagram showing the structure of a receiver of a UE for performing half-duplex D2D communication.

First, in FIG. 8(a), only one reception circuit is implemented and a switch located at a previous stage of the reception circuit selects any one of a downlink band signal and an uplink band signal. In contrast, in FIG. 8(b), RF circuits for receiving a downlink band signal and an uplink band signal are included, only one baseband processing circuit is included, and switches located at previous stages of the RF circuits select one of the downlink band signal and the uplink band signal.

As described above, since UEs capable of performing D2D communication may be divided into a UE for performing full-duplex operation and a UE for performing half-duplex operation, the UE may inform the eNB of D2D communication, which may be performed by the UE, in an initial connection process. In particular, full-duplex operation and half-duplex operation may be determined by D2D communication type.

For example, full-duplex communication is provided to a UE capable of receiving user data via D2D communication, thereby receiving a signal of an eNB even in relatively frequent D2D communication. In contrast, half-duplex D2D communication is provided to a UE, which may not receive user data via D2D communication and may receive a specific signal transmitted by another UE, that is, a signal transmitted in a predetermined format in order to determine proximity of the UE, thereby reducing UE implementation costs.

Hereinafter, a method of solving a restriction on reception of a signal of an eNB due to half-duplex D2D communication will be described. Although transmission of a signal via D2D communication is mainly described with respect to a UE, if an eNB transmits a signal to UE via uplink resources, the eNB is regarded as a UE and the present invention is applicable to the eNB.

As described above, if a UE for performing half-duplex D2D communication receives a signal of another UE on a specific subframe via uplink resources, a signal may not be received from the eNB via downlink resources at this time. Accordingly, the eNB should avoid transmission of the signal to the UE via downlink resources, e.g., transmission of a PDSCH/PDCCH at this time.

If the eNB dynamically schedules signal transmission of every subframe, this transmission may be avoided. In contrast, in the case of semi-persistent scheduling (SPS) used for a real-time data service or paging for informing a UE that a received signal is present, it may be difficult to always prevent a transmission time of a semi-statically transmitted signal from overlapping a reception time of a signal via D2D communication.

In this case, the UE may not receive the signal of the eNB, which is semi-statically scheduled at a corresponding time, by assigning higher priority to the signal received via D2D communication. Since the eNB may also determine when the UE receives the signal via D2D communication, the eNB may transmit the downlink signal to the UE when the downlink signal does not collide with the signal received via D2D communication.

In the case of SPS, for example, if reception of a downlink SPS signal and reception of the signal via D2D communication collide, the UE does not receive the SPS signal and transmits NACK upon transmitting HARQ feedback therefor or does not transmit ACK/NACK and the eNB may perform retransmission of the packets at an appropriate time.

It is difficult to avoid collision between a PHICH corresponding to ACK/NACK for a PUSCH transmitted by the UE and a signal received via D2D communication among signals transmitted by the eNB. This is because a time when the PHICH for the PUSCH transmitted at the specific time is transmitted is predetermined. Accordingly, although the UE should transmit the PUSCH and receive the PHICH at the specific time, when reception of the signal via D2D communication is also performed at the specific time, the UE may receive the signal via D2D communication without receiving the PHICH.

When the PHICH indicating NACK has been received, since a higher layer of the UE indicates automatic retransmission of the PUSCH, the PHICH is not received. If the signal is received via D2D communication, the UE assumes that the PHICH indicates ACK and reports ACK to a higher layer. When the PUSCH is not correctly received, the eNB may directly indicate retransmission of the PUSCH via uplink grant at an appropriate time. This will be described with reference to the drawing.

Figure 9:
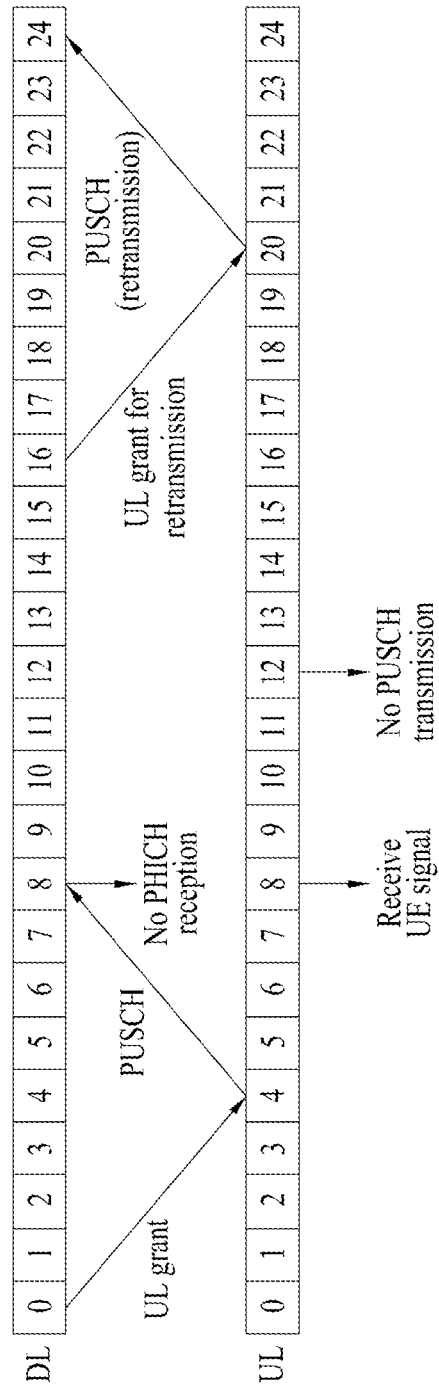
FIG. 9 is a diagram showing an example of a HARQ process according to an embodiment of the present invention.

FIG. 9 is a diagram showing an example of a HARQ process according to an embodiment of the present invention.

Referring to FIG. 9, since the UE does not receive a PHICH on subframe #8 due to reception of the signal via D2D communication, retransmission of the PUSCH on subframe #12 is not performed by processing the PHICH indicating ACK. If errors occur in reception of the PUSCH transmitted on subframe #4, the eNB transmits uplink grant on subframe #16 corresponding to the same HARQ process to indicate retransmission and the UE performs retransmission on subframe #20.

The present invention has been described on the assumption that the boundaries of the downlink subframe and the uplink subframe completely match. However, due to timing advance (TA) applied to an uplink subframe in order to compensate for propagation delay between the eNB and the UE, the boundary of the downlink subframe received by the UE and boundary of the uplink subframe transmitted by the UE do not completely match.

Further, since D2D communication is likely to be performed between adjacent UEs, the signal received by the UE via D2D communication is also likely to be received at uplink subframe timing of the UE. If the UE, which performs half-duplex D2D communication, receives a signal on one uplink subframe via D2D communication, reception of two or more downlink subframes may be restricted. That is, if the UE, which performs half-duplex D2D communication, receives a signal on uplink subframe #n via D2D communication, reception of the signal from eNB on a plurality of downlink subframes adjacent to subframe #n may be restricted. This will be described with reference to the drawing.

Figure 10:
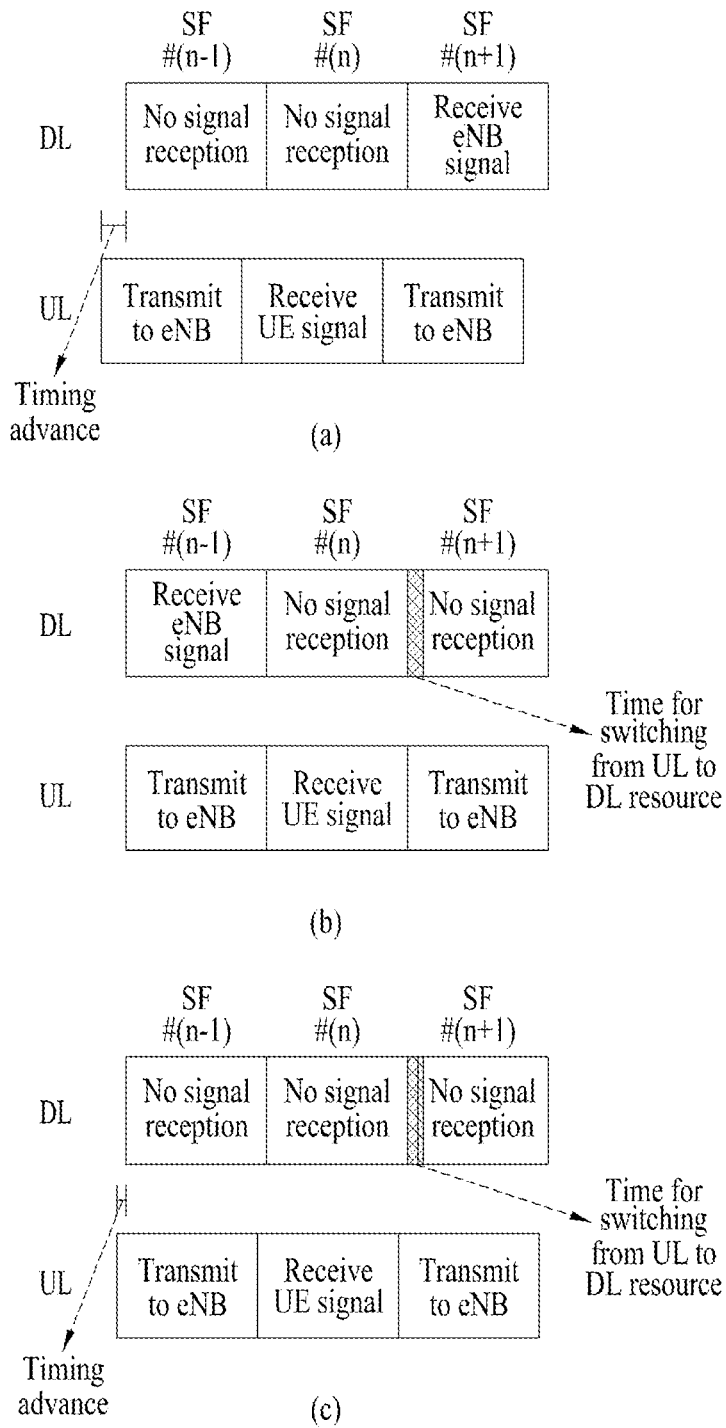
FIG. 10 is a diagram showing an example of a downlink subframe at which reception is restricted due to half-duplex D2D communication according to an embodiment of the present invention.

FIG. 10 is a diagram showing an example of a downlink subframe at which reception is restricted due to half-duplex D2D communication according to an embodiment of the present invention.

First, referring to FIG. 10($a$), since an uplink subframe generally precedes a downlink subframe by TA, when a signal is received on uplink subframe #n via D2D communication, reception of downlink signals on subframe #(n−1) and subframe #n may be restricted.

Next, referring to FIG. 10($b$), if the UE receives the signal up to a last symbol of the uplink subframe via D2D communication in a state in which a TA value is very small, since it takes a predetermined time to switch the circuit of the UE from uplink resource to downlink resource, a problem may occur in reception of some initial OFDM symbols of subframe #(n+1). In this case, reception of downlink signals on two subframes #n and #(n+1) may be restricted.

Lastly, referring to FIG. 10($c$), in order to include the above-described two cases, reception of downlink signals on three uplink subframes #(n−1), #n and #(n+1) may be restricted.

The UE may report which of various restrictions on downlink signal reception is suitable for a current communication state to the eNB or the eNB may set an appropriate restriction and reports the restriction to the UE. Alternatively, one specific restriction may be applied in order to reduce time and resources required for information exchange. In this case, as shown in FIG. 10($c$), it may be determined that most subframes are restricted.

Additionally, the restriction on reception of the downlink signal from the eNB may be changed according to a resource region occupied by a signal transmitted by the eNB.

For example, in the case of a signal transmitted using some initial OFDM symbols of each subframe, such as a PHICH, reception of a signal via D2D communication does not have influence on reception of the downlink signal on a preceding subframe, except that a TA value is very large. Accordingly, as shown in FIG. 10($b$), if the signal is received on uplink subframe #n via D2D communication, the PHICH may be received on downlink subframe #(n−1). That is, the PHICH may not be received on downlink subframe #n but may be received on downlink subframe #(n−1).

Further, when the eNB always applies an appropriate TA value to the UE, subframe timings shown in FIG. 10($a$) appear. In this case, the PHICH is not restricted even on downlink subframe #(n+1). The same principle as the PHICH is also applicable to a PDCCH transmitted on some initial OFDM symbols along with the PHICH. In contrast, since the PDSCH is transmitted up to a last symbol of each subframe, reception on subframe #(n−1) becomes impossible only when a small TA value is applied.

Alternatively, a restriction on reception of the signal from the eNB, that is, reception of the downlink signal, may be changed according to a resource region occupied by the signal received by the UE via D2D communication.

For example, when user data is transmitted using all symbols of one subframe via D2D communication, reception of the downlink signal on the previous and next subframes of that subframe may be restricted in order to compensate for TA influence and a time required to switch from uplink resources to downlink resources.

In contrast, when a signal received by the UE via D2D communication is a pre-signaled signal for detecting a specific UE, does not require many resources and is transmitted only on some symbols, a restriction on reception of the downlink signal may be imposed only at a subframe on which the signal is received via D2D communication.

In order to reduce the restriction on reception of the PDSCH, transmission of the PDSCH finishes early in a previous subframe of a subframe on which the signal is received via D2D communication. This will be described with reference to the drawing.

Figure 11:
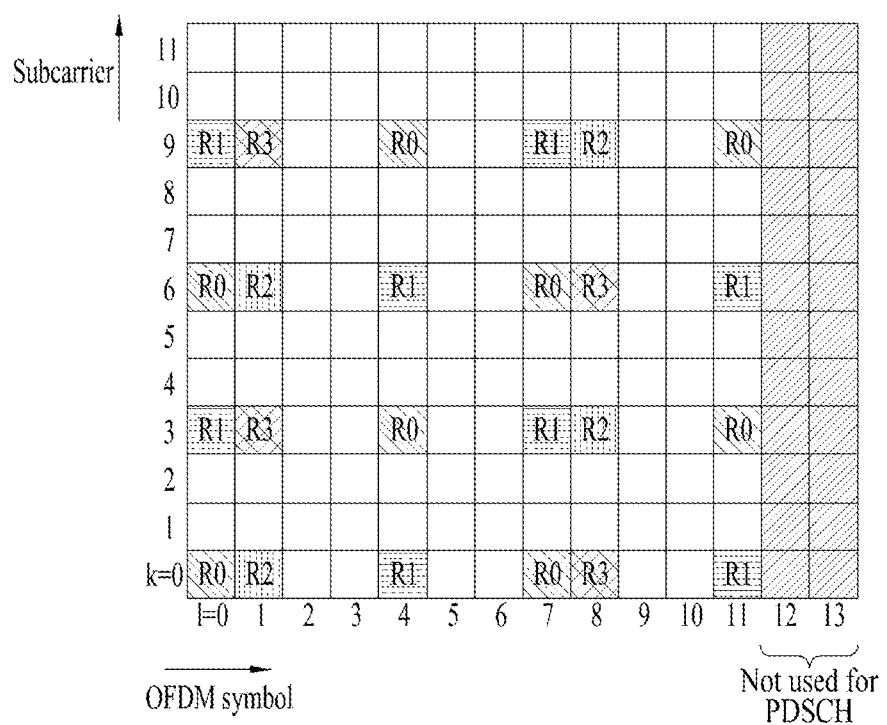
FIG. 11 is a diagram showing an example of transmitting a PDSCH on a previous subframe of a subframe, on which a signal is received via D2D communication, according to an embodiment of the present invention.

FIG. 11 is a diagram showing an example of transmitting a PDSCH on a previous subframe of a subframe, on which a signal is received via D2D communication, according to an embodiment of the present invention. In particular, in FIG. 11, assume that last two OFDM symbols of downlink subframe #(n−1) are not used to transmit the PDSCH in a state of applying general TA, as shown in FIG. 10(a).

The location of a demodulation reference signal (DM-RS) used to receive the PDSCH may be moved to OFDM symbols to which the PDSCH may be mapped. This will be described with reference to the drawing.

FIG. 12 is a diagram showing an example of mapping a demodulation reference signal (DM-RS) when transmission of a PDSCH finishes early, according to an embodiment of the present invention.

First, FIG. 12(a) shows a general example of mapping a DM-RS when transmission of the PDSCH finishes early. In particular, a DM-RS defined by antenna port 7 and a DM-RS defined by antenna port 8 are mapped to the same RE using a code division multiplexing method and a DM-RS defined by antenna port 9 and a DM-RS defined by antenna port 10 are mapped to the same RE using a code division multiplexing method.

In FIGS. 12(a) and 12(b), since the last two OFDM symbols are not used for reception of the signal via D2D communication, transmission of the PDSCH finishes early. In particular, FIG. 12(b) shows an example of mapping a DM-RS of a first symbol and a DM-RS of a second symbol in a state of being shifted forward by 3 symbols. FIG. 12(c) shows an example of maintaining the DM-RS of the first symbol and mapping the DM-RS of the second symbol in a state of being shifted forward by 3 symbols.

If the eNB appropriately controls the TA value of the UE for performing D2D communication to locate a start time of an uplink subframe for performing D2D communication in an OFDM symbol region which is not used for PDSCH transmission at a preceding subframe, it is possible to reduce the number of subframes at which downlink signal reception is restricted.

Figure 13:
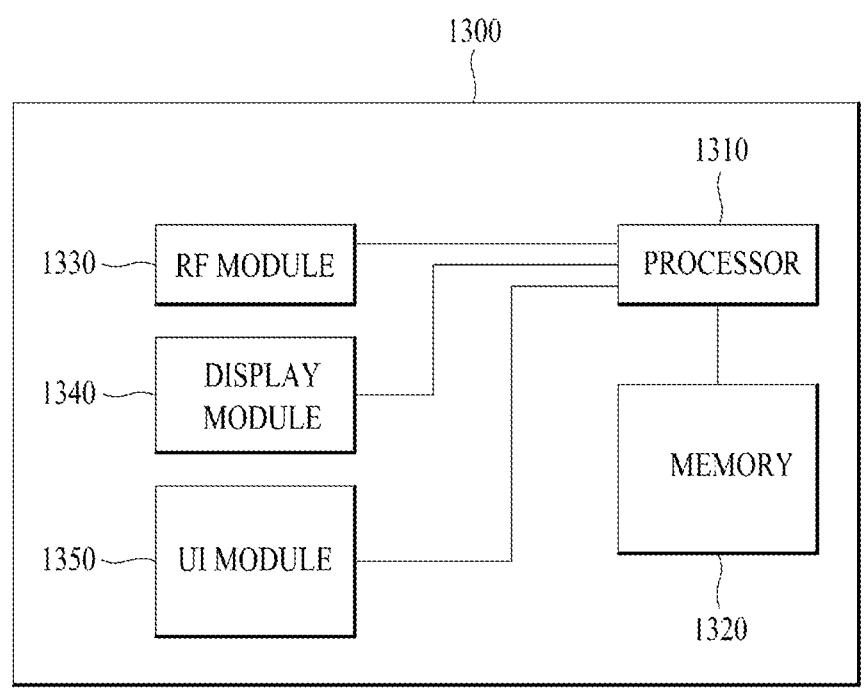
FIG. 13 is a block diagram of a communication apparatus according to an embodiment of the present invention.

FIG. 13 is a block diagram for an example of a communication device according to one embodiment of the present invention.

Referring to FIG. 13, a communication device 1300 may include a processor 1310, a memory 1320, an RF module 1330, a display module 1340, and a user interface module 1350.

Since the communication device 1300 is depicted for clarity of description, prescribed module(s) may be omitted in part. The communication device 1300 may further include necessary module(s). And, a prescribed module of the communication device 1300 may be divided into subdivided modules. A processor 1310 is configured to perform an operation according to the embodiments of the present invention illustrated with reference to drawings. In particular, the detailed operation of the processor 1310 may refer to the former contents described with reference to FIG. 1 to FIG. 12.

The memory 1320 is connected with the processor 1310 and stores an operating system, applications, program codes, data, and the like. The RF module 1330 is connected with the processor 1310 and then performs a function of converting a baseband signal to a radio signal or a function of converting a radio signal to a baseband signal. To this end, the RF module 1330 performs an analog conversion, amplification, a filtering, and a frequency up conversion, or performs processes inverse to the former processes. The display module 1340 is connected with the processor 1310 and displays various kinds of informations. And, the display module 1340 can be implemented using such a well-known component as an LCD (liquid crystal display), an LED (light emitting diode), an OLED (organic light emitting diode) display and the like, by which the present invention may be non-limited. The user interface module 1350 is connected with the processor 1310 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example in which a method and apparatus for performing D2D communication in a wireless communication system is applied to a 3GPP LTE system has been described, the present invention is applicable to various wireless communication systems in addition to the 3GPP LTE system.

The invention claimed is:

1. A method for performing device-to-device (D2D) communication at a user equipment (UE) in a wireless communication system, the method comprising:
   receiving a signal from another UE via D2D communication on a first subframe; and
   receiving a signal from a base station on a second subframe,
   wherein reception of the signal via D2D communication is performed when the first subframe and the second subframe overlap, and
   wherein, when the signal is received from the base station on a previous subframe of the first subframe, a predetermined number of last symbols of the previous subframe is not used to receive the signal from the base station.

2. The method according to claim 1, further comprising transmitting, to the base station, information indicating that only one of reception of the signal via D2D communication and reception of the signal from the base station may be performed.

3. The method according to claim 1, further comprising, when the signal from the base station is a response signal to an uplink data channel transmitted from the UE to the base station, reporting, to a higher layer, that the response signal is a positive response.

4. The method according to claim 1, wherein, when the signal is received from the base station on a next subframe of the first subframe, a predetermined number of start symbols of the next subframe is not used to receive the signal from the base station.

5. The method according to claim 4, wherein the predetermined number is determined based on timing advance applied to the first subframe.

6. The method according to claim 1, wherein the predetermined number is determined based on timing advance applied to the first subframe.

7. A user equipment (UE) apparatus for performing device-to-device (D2) communication in a wireless communication system, the UE apparatus comprising:
   a wireless communication module configured to transmit and receive a signal to and from a base station or a counterpart UE apparatus of D2D communication; and
   a processor configured to process the signal,
   wherein the processor receives a signal from the counterpart UE apparatus on a first subframe via D2D communication, receives a signal from the base station on a second subframe, and performs reception of the signal via D2D communication when the first subframe and the second subframe overlap, and
   when the signal is received from the base station on a previous subframe of the first subframe, a predetermined number of last symbols of the previous subframe is not used to receive the signal from the base station.

8. The UE apparatus according to claim 7, wherein the processor transmits, to the base station, information indicating that only one of reception of the signal via D2D communication and reception of the signal from the base station may be performed.

9. The UE apparatus according to claim 7, wherein, when the signal from the base station is a response signal to an uplink data channel transmitted from the UE to the base station, the processor reports, to a higher layer, that the response signal is a positive response.

10. The UE apparatus according to claim 7, wherein, when the signal is received from the base station on a next subframe of the first subframe, a predetermined number of start symbols of the next subframe is not used to receive the signal from the base station.

11. The UE apparatus according to claim 10, wherein the predetermined number is determined based on timing advance applied to the first subframe.

12. The UE apparatus according to claim 7, wherein the predetermined number is determined based on timing advance applied to the first subframe.

* * * * *